US012562310B2

(12) United States Patent
Yamaguchi et al.

(10) Patent No.: US 12,562,310 B2
(45) Date of Patent: Feb. 24, 2026

(54) ELECTRONIC COMPONENT

(71) Applicant: Murata Manufacturing Co., Ltd., Nagaokakyo (JP)

(72) Inventors: Shinichi Yamaguchi, Nagaokakyo (JP); Shoichiro Suzuki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 113 days.

(21) Appl. No.: 18/667,273

(22) Filed: May 17, 2024

(65) Prior Publication Data

US 2024/0304388 A1 Sep. 12, 2024

Related U.S. Application Data

(63) Continuation of application No. PCT/JP2023/000416, filed on Jan. 11, 2023.

(30) Foreign Application Priority Data

Jan. 17, 2022 (JP) ................................. 2022-004907

(51) Int. Cl.
| | |
|---|---|
| *H01G 4/012* | (2006.01) |
| *H01G 4/008* | (2006.01) |
| *H01G 4/30* | (2006.01) |

(52) U.S. Cl.
CPC ............. *H01G 4/012* (2013.01); *H01G 4/008* (2013.01); *H01G 4/30* (2013.01); *H01G 4/0085* (2013.01)

(58) Field of Classification Search
None
See application file for complete search history.

(56) References Cited

U.S. PATENT DOCUMENTS

2018/0374643 A1 12/2018 Inomata et al.
2020/0066454 A1 2/2020 Cha et al.
(Continued)

FOREIGN PATENT DOCUMENTS

JP 2019009222 A 1/2019
JP 2020031202 A 2/2020
(Continued)

OTHER PUBLICATIONS

International Search Report in PCT/JP2023/000416, mailed Mar. 14, 2023, 3 pages.
(Continued)

*Primary Examiner* — Eric W Thomas
(74) *Attorney, Agent, or Firm* — Keating & Bennett, LLP

(57) ABSTRACT

An electronic component includes a multilayer body in which a dielectric layer having a thickness of about 0.8 μm or more and about 4.1 μm or less and an inner electrode layer having a thickness of about 0.5 μm or more and about 1.2 μm or less are alternately stacked, the number of each of the dielectric layer and the inner electrode layer being 200 or more and 650 or less. A solid solution layer in which a first metal component defines a solid solution with a second metal component is at an interface between the inner electrode layer and the dielectric layer, and including a central solid solution layer located about 10 μm or more from an end portion in a facing portion in a length direction and a width direction, where the adjacent inner electrode layers oppose each other.

20 Claims, 6 Drawing Sheets

(56)               References Cited

U.S. PATENT DOCUMENTS

| | | |
|---|---|---|
| 2021/0098191 A1 | 4/2021 | Saito et al. |
| 2021/0202171 A1* | 7/2021 | Tsutsui ................... H01G 4/248 |
| 2021/0202177 A1 | 7/2021 | Kurosu et al. |
| 2021/0375548 A1* | 12/2021 | Miyazaki ................. H01G 4/12 |
| 2023/0207196 A1* | 6/2023 | Doi .......................... H01G 4/30 |
| | | 174/260 |
| 2024/0105391 A1* | 3/2024 | Kitahara ............. H01G 4/0085 |

FOREIGN PATENT DOCUMENTS

| | | |
|---|---|---|
| JP | 2021034648 A | 3/2021 |
| JP | 2021108360 A | 7/2021 |

OTHER PUBLICATIONS

Written Opinion in PCT/JP2023/000416, mailed Mar. 14, 2023, 3 pages.

* cited by examiner

FIG. 3

FIG. 5A
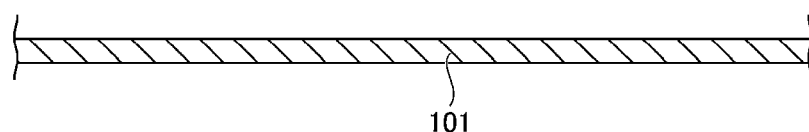
101
FIG. 5B
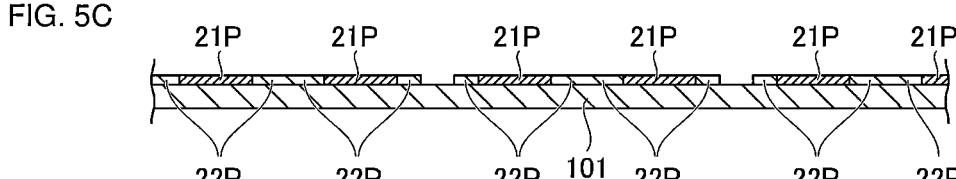
21P   21P   21P   21P   21P   21P
101
FIG. 5C
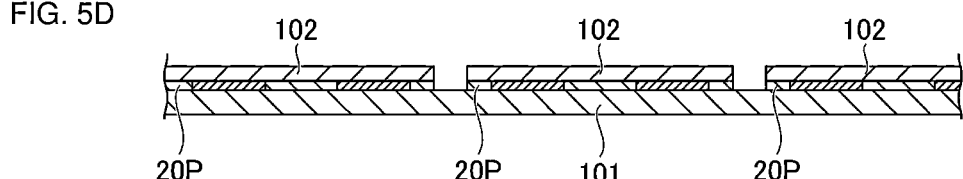
21P   21P   21P   21P   21P   21P
22P   22P   22P   101   22P   22P   22P
FIG. 5D
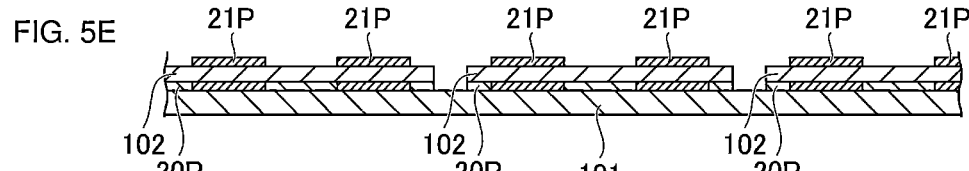
102   102   102
20P   20P   101   20P
FIG. 5E
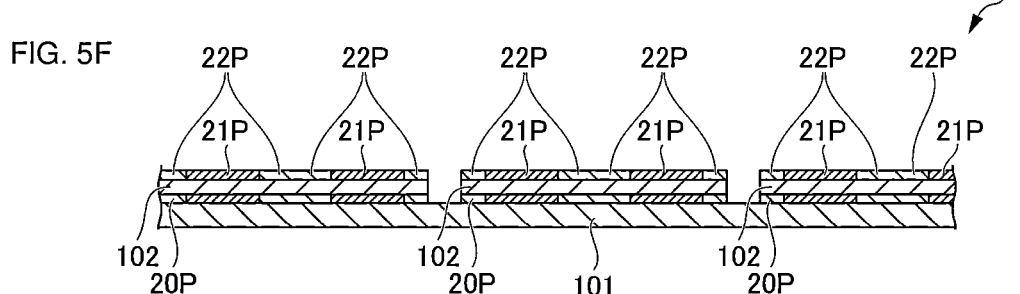
21P   21P   21P   21P   21P   21P
102   102   102
20P   20P   101   20P
103
FIG. 5F
22P   22P   22P   22P   22P   22P
21P   21P   21P   21P   21P   21P
102   102   102
20P   20P   101   20P

ELECTRONIC COMPONENT

CROSS REFERENCE TO RELATED APPLICATIONS

This application claims the benefit of priority to Japanese Patent Application No. 2022-004907 filed on Jan. 17, 2022 and is a Continuation application of PCT Application No. PCT/JP2023/000416 filed on Jan. 11, 2023. The entire contents of each application are hereby incorporated herein by reference.

BACKGROUND OF THE INVENTION

1. Field of the Invention

The present invention relates to electronic components.

2. Description of the Related Art

For example, an electronic component serving as a multilayer ceramic capacitor includes a multilayer body in which a plurality of dielectric layers and a plurality of inner electrode layers are alternately stacked and two outer electrodes disposed on respective end surfaces located on both sides of the multilayer body in a length direction (refer to Japanese Unexamined Patent Application Publication No. 2019-09222).

SUMMARY OF THE INVENTION

Such an electronic component is required to have high reliability when a voltage is applied. Example embodiments of the present invention provide electronic components each capable of having high reliability when a voltage is applied.

An example embodiment of the present invention provides an electronic component including a multilayer body in which a dielectric layer having a thickness of about 0.8 μm or more and about 4.1 μm or less and an inner electrode layer having a thickness of about 0.5 μm or more and about 1.2 μm or less are alternately stacked, a number of each of the dielectric layer and the inner electrode layer being 200 or more and 650 or less, wherein a solid solution layer in which a first metal component serving as a primary component of the inner electrode layer defines a solid solution with a second metal component different from the first metal component is located at an interface between the inner electrode layer and the dielectric layer, the solid solution layer includes a central solid solution layer located about 10 μm or more from an end portion in a facing portion in a length direction and a width direction, where the adjacent inner electrode layers oppose each other, and an outer solid solution layer surrounding the central solid solution layer, and a ratio of the second metal component to the first metal component in the central solid solution layer is larger than that in the outer solid solution layer.

According to example embodiments of the present invention, electronic components each capable of having high reliability when a voltage is applied are provided.

The above and other elements, features, steps, characteristics and advantages of the present invention will become more apparent from the following detailed description of the example embodiments with reference to the attached drawings.

BRIEF DESCRIPTION OF THE DRAWINGS

FIG. 3 is a sectional view of the section of the multilayer ceramic capacitor 1, taken along line III-III in FIG. 1.

FIGS. 5A to 5F are diagrams illustrating steps of producing a multilayer sheet 103 in the method for manufacturing the multilayer ceramic capacitor 1.

DETAILED DESCRIPTION OF THE EXAMPLE EMBODIMENTS

Figure 1:
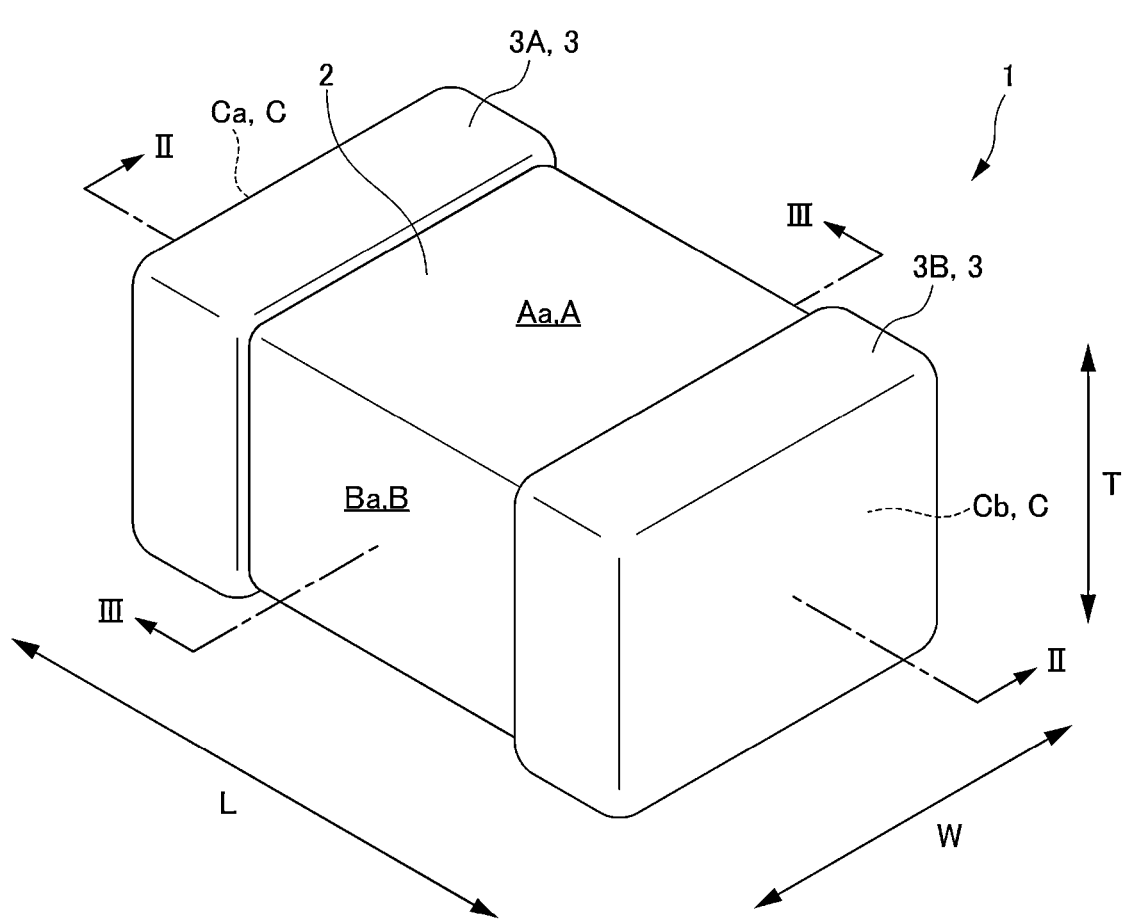
FIG. 1 is a schematic perspective view of a multilayer ceramic capacitor 1 according to an example embodiment of the present invention.
Figure 2:
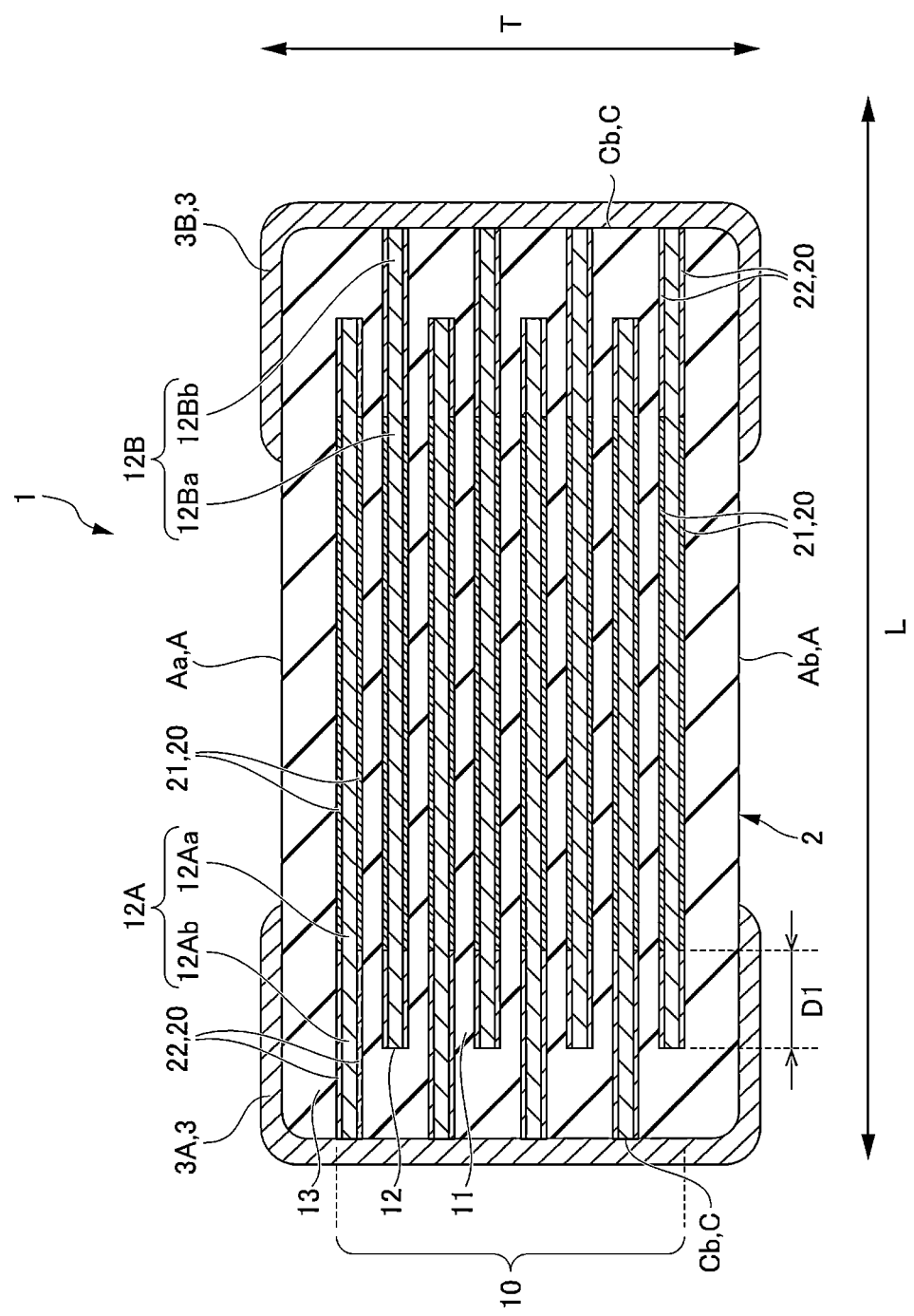
FIG. 2 is a sectional view of the section of the multilayer ceramic capacitor 1, taken along line II-II in FIG. 1.
Figure 3:
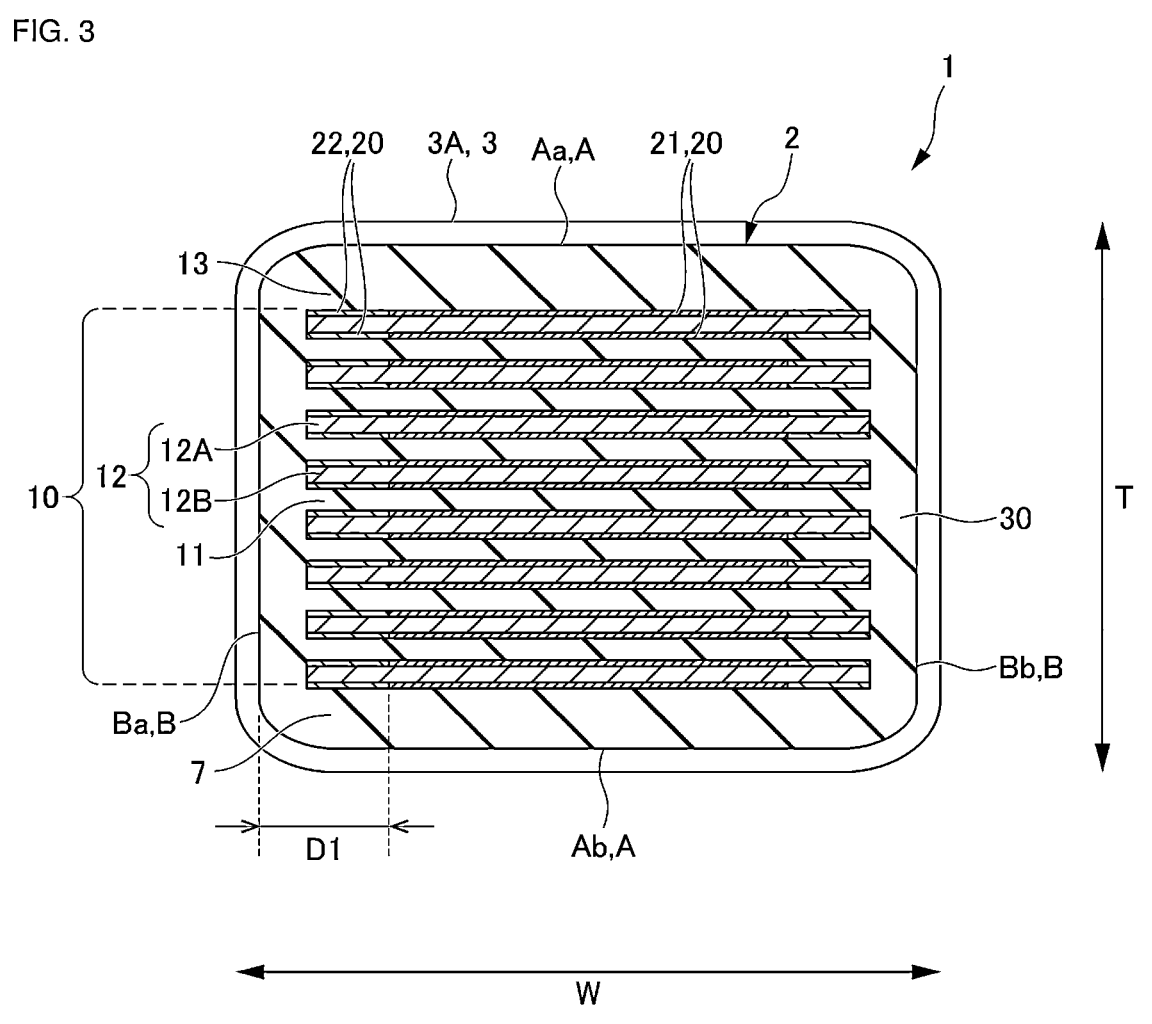

Multilayer ceramic capacitors according to example embodiments of the present invention will be described below. FIG. 1 is a schematic perspective view of the multilayer ceramic capacitor 1 according to the present example embodiment. FIG. 2 is a sectional view of the section of the multilayer ceramic capacitor 1, taken along line II-II in FIG. 1. FIG. 3 is a sectional view of the section of the multilayer ceramic capacitor 1, taken along line III-III in FIG. 1.

The multilayer ceramic capacitor 1 includes a multilayer body 2 and a pair of outer electrodes 3 disposed at both ends of the multilayer body 2. The multilayer body 2 includes an inner layer portion 10 in which dielectric layers 11 and inner electrode layers 12 are alternately stacked.

In the following description, regarding terms indicating the direction of the multilayer ceramic capacitor 1, a direction in which the pair of outer electrodes 3 are disposed in the multilayer ceramic capacitor 1 is denoted by a length direction L. A direction in which the dielectric layers 11 and the inner electrode layers 12 are stacked is denoted by a stacking direction T. A direction intersecting both the length direction L and the stacking direction T is denoted by a width direction W. In this regard, in the present example embodiment, the width direction w is orthogonal to both the length direction L and the stacking direction T. The stacking direction T is also referred to as a thickness direction.

The multilayer ceramic capacitor 1 has, for example, a withstand voltage of about 25 V. In addition, the multilayer ceramic capacitor 1 has a substantially rectangular parallelepiped shape, the length direction L dimension is about 0.6 mm or more and about 3.2 mm or less, the width direction W dimension is about 0.3 mm or more and about 2.5 mm or less, and the thickness direction (stacking direction T) dimension is about 0.3 mm or more and about 2.5 mm or less, for example. Further, regarding the multilayer ceramic capacitor 1, preferably, the chip size is 1005 size to 2012 size, the length direction L dimension is about 1.0 mm or more and about 2.0 mm or less, the width direction W dimension and the thickness direction (stacking direction T) dimension are about 0.5 mm or more and about 1.25 mm or less, for example.

In this regard, in the following description, of six outer surfaces of the multilayer body 2, a pair of outer surfaces opposite to each other in the stacking direction T are denoted by a first principal surface Aa and a second principal surface Ab, a pair of outer surfaces opposite to each other in the width direction W are denoted by a first side surface Ba and a second side surface Bb, and a pair of outer surfaces opposite to each other in the length direction L are denoted by a first end surface Ca and a second end surface Cb. In this regard, when there is no need of different description between the first principal surface Aa and the second principal surface Ab, these are generically described as principal surface A, when there is no need for different description between the first side surface Ba and the second side surface Bb, these are generically described as side surface B, and when there is no need of different description between the first end surface Ca and the second end surface Cb, these are generically described as end surface C.

Multilayer Body 2

The multilayer body 2 includes an inner layer portion 10, outer layer portions 13 disposed on respective sides of the inner layer portion 10 in the stacking direction T, and side gap portions 30 disposed on both sides of the inner layer portion 10 and the outer layer portions 13 in the width direction W.

Inner Layer Portion 10

In the inner layer portion 10, the dielectric layers 11 and the inner electrode layers 12 are alternately stacked one by one.

Dielectric Layer 11

The dielectric layer 11 is produced by, for example, sintering a ceramic green sheet obtained by molding a slurry in which a binder, additives such as a plasticizer and a dispersing agent, and an organic solvent are added to a mixture into the shape of a sheet, where the mixture is produced by mixing a ceramic powder that is $BaTio_3$, a glass component, and a sintering auxiliary added as the situation demands. The thickness of the dielectric layer 11 is, for example, about 0.8 µm or more and about 4.1 µm or less and preferably about 0.8 µm or more and about 2.0 µm or less. In this regard, the number of the dielectric layers 11 is, for example, 200 or more and 650 or less.

Inner Electrode Layer 12

The inner electrode layer 12 is produced by sintering an inner electrode layer paste including a powder of a first metal component serving as a primary component, a binder, additives such as a plasticizer and a dispersing agent, an organic solvent, and the like. The first metal component serving as a primary component of the inner electrode layer 12 is Ni in the current example embodiment, and in the following description, the first metal component is assumed to be Ni.

The inner electrode layer 12 includes a plurality of first inner electrode layers 12A and a plurality of second inner electrode layers 12B. The first inner electrode layers 12A and the second inner electrode layers 12B are alternately disposed. The thickness of the inner electrode layer 12 is, for example, about 0.5 µm or more and about 1.2 µm or less and preferably about 0.5 µm or more and about 0.85 µm or less. In this regard, the number of the inner electrode layers 12 is, for example, 200 or more and 650 or less in total of the first inner electrode layers 12A and the second inner electrode layers 12B.

The first inner electrode layer 12A has a first facing portion 12Aa opposing the second inner electrode layer 12B and a first extended portion 12Ab that extends from the first facing portion 12Aa to the first end surface Ca. An end portion of the first extended portion 12Ab is exposed at the first end surface Ca and is electrically coupled to the first outer electrode 3A described later.

The second inner electrode layer 12B has a second facing portion 12Ba opposing the first inner electrode layer 12A and a second extended portion 12Bb that extends from the second facing portion 12Ba to the second end surface Cb. An end portion of the second extended portion 12Bb is electrically coupled to the second outer electrode 3B described later.

Then, an electric charge is accumulated in the first facing portion 12Aa of the first inner electrode layer 12A and the second facing portion 12Ba of the second inner electrode layer 12B.

In this regard, when there is no need of different description between the first facing portion 12Aa and the second facing portion 12Ba, these are generically described as facing portion 12a, and when there is no need of different description between the first extended portion 12Ab and the second extended portion 12Bb, these are generically described as extended portion 12b.

Solid Solution Layer 20

A solid solution layer 20 in which Ni serving as a first metal component forms a solid solution with a second metal component different from the first metal component is disposed at an interface to the dielectric layer 11 or the outer layer portion 13 on both sides of the inner electrode layer 12 in the stacking direction T. The solid solution layer 20 includes a central solid solution layer 21 and an outer solid solution layer 22.

The second metal component is preferably Sn, In, Ga, Zn, Bi, Pb, Fe, V, Y, or Cu, the second metal component is Sn in the present example embodiment, and in the following description, the second metal component is assumed to be Sn.

In this regard, the solid solution layer 20 is a layer in which Ni atoms in a Ni atom arrangement structure are randomly substituted with Sn atoms while the Ni atom arrangement structure is maintained. The thickness of the solid solution layer 20 is preferably about 1 nm or more and about 20 nm or less, for example.

In the present example embodiment, the solid solution layer 20 is disposed at interfaces on both sides of the inner electrode layer 12 in the stacking direction T. However, the solid solution layer 20 is not limited to this and may be disposed at an interface on only one side of the inner electrode layer 12 in the stacking direction T. In this regard, the solid solution layer 20 is disposed on every inner electrode layer 12 in the present example embodiment. However, the solid solution layer 20 is not limited to this, and the solid solution layer 20 may be disposed on only a portion of the inner electrode layers 12.

Central Solid Solution Layer 21

The central solid solution layer 21 is disposed at an interface between the inner electrode layer 12 and the dielectric layer 11 or the outer layer portion 13 in a central region of the multilayer body 2 in the length direction L and the width direction W. In the central solid solution layer 21, a ratio of Sn to Ni in a solid solution is larger than that in the outer solid solution layer 22. In this regard, the interface not only denotes a boundary but also denotes a region that may include a portion of the inner electrode layer 12 and the dielectric layer 11 or the outer layer portion 13.

The central solid solution layer 21 is a region located at a distance D1 or more from an end portion in the facing portion 12a in a length direction L and an end portion in the facing portion 12a in the width direction W. The distance D1 is about 10 µm in the present example embodiment, for example.

In the central solid solution layer 21, an amount of Sn in the solid solution is about 0.008 or more and about 0.025 or less and preferably about 0.02 relative to a total amount of moles of Ni and Sn, that is, about 2% by mole, for example. In this regard, the ratio of Sn to Ni is an averaged value, where ten points of interfaces in the central portion in the stacking direction T, the central portion in the width direction W, and the central portion in the length direction L are subjected to measurement by TEM analysis.

Outer Solid Solution Layer 22

The outer solid solution layer 22 is disposed in a region surrounding the central solid solution layer 21 of the facing portion 12a. That is, the outer solid solution layer 22 is a region from an end portion in the length direction L and an end portion in the width direction W of the facing portion 12a to the position of the distance D1.

In the outer solid solution layer 22, an amount of Sn in the solid solution is about 0.001 or more and about 0.005 or less and preferably about 0.005 relative to a total amount of moles of Ni and Sn, that is, about 0.5% by mole, for example.

Outer Layer Portion 13

The outer layer portion 13 is disposed on both sides of the inner layer portion 10 in the stacking direction T and is formed of the same dielectric ceramic material as the dielectric layer 11.

Side Gap Portion 30

The side gap portion 30 is disposed on both sides of the inner layer portion 10 and the outer layer portions 13 in the width direction W and is formed of the same dielectric ceramic material as the dielectric layer 11.

Outer Electrode 3

The outer electrode 3 is disposed on both end surfaces C of the multilayer body 2. The outer electrode 3 covers not only the end surface C but also a portion of the principal surface A and the side surface B on the end surface C side.

As described above, the end portion of the first extended portion 12Ab of the first inner electrode layer 12A is exposed at the first end surface Ca and is electrically coupled to the first outer electrode 3A. In addition, the end portion of the second extended portion 12Bb of the second inner electrode layer 12B is exposed at the second end surface Cb and is electrically coupled to the second outer electrode 3B. Accordingly, in the structure between the first outer electrode 3A and the second outer electrode 3B, a plurality of capacitor elements are electrically coupled in parallel.

Production Step

Figure 4:
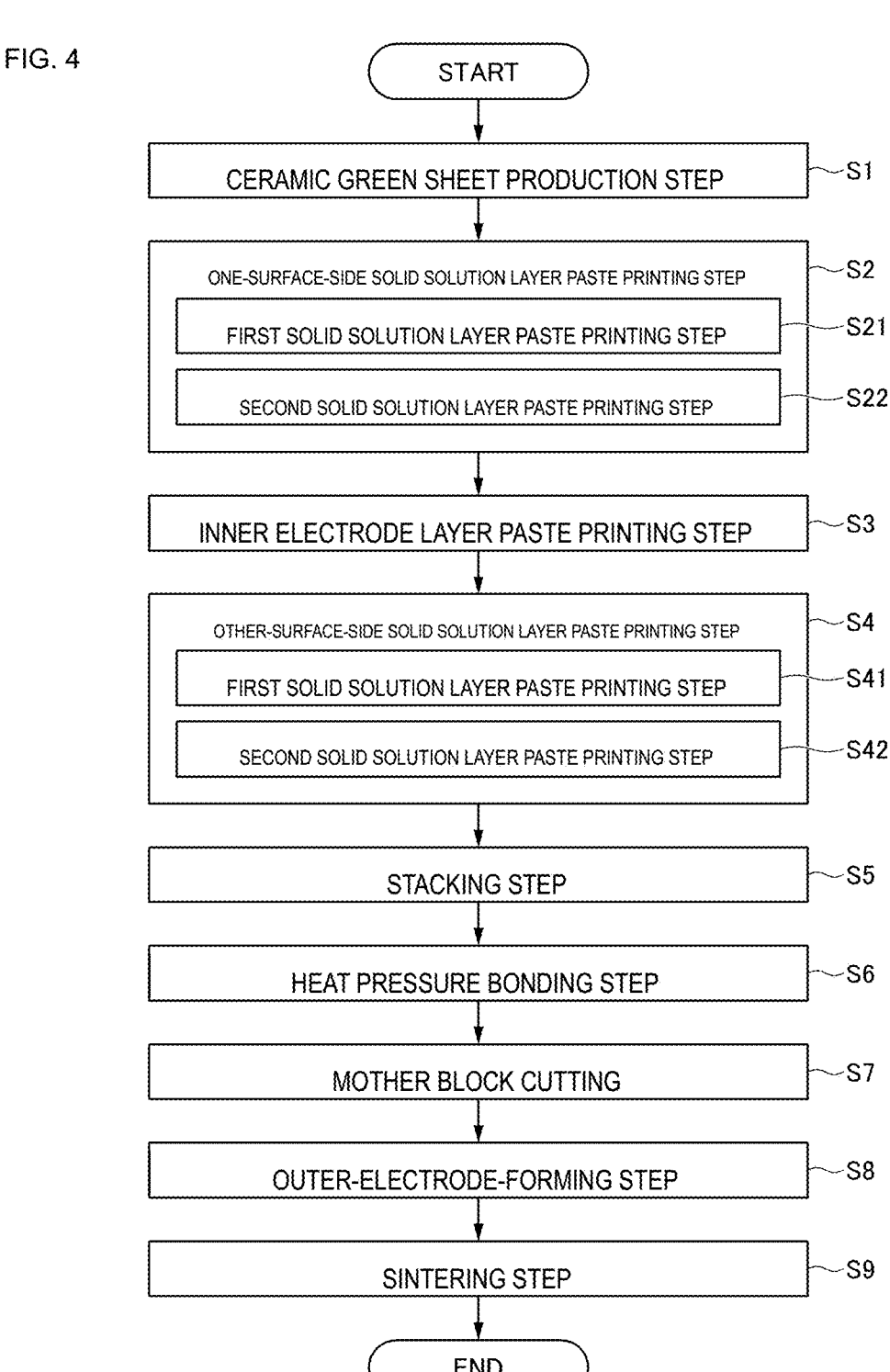
FIG. 4 is a flow chart illustrating an example of a method for manufacturing the multilayer ceramic capacitor 1.

FIG. 4 is a flow chart illustrating an example of a method for manufacturing the multilayer ceramic capacitor 1. In this regard, this manufacturing method is an exemplification, and the present invention is not limited to this. FIGS. 5A to 5F are diagrams illustrating steps of producing a multilayer sheet 103, described later, in the method for manufacturing the multilayer ceramic capacitor 1. The steps of producing the multilayer sheet 103 are also an exemplification, and the present invention is not limited to this.

Ceramic Green Sheet Production Step S1

To begin with, a ceramic slurry including a ceramic powder, a binder, and a solvent is prepared. An inner layer portion ceramic green sheet 101 illustrated in FIG. 5A is produced by the resulting ceramic slurry being printed into the shape of a sheet on a carrier film by using a die coater, a gravure coater, a microgravure coater, or the like.

One-Surface-Side Solid Solution Layer Paste Printing Step S2

The one-surface-side solid solution layer paste printing step S2 includes a central solid solution layer paste printing step S21 and an outer solid solution layer paste printing step S22.

Central Solid Solution Layer Paste Printing Step S21

Initially, as illustrated in FIGS. 5A to 5F, a central solid solution layer paste 21P is printed on the surface of the inner layer portion ceramic green sheet 101. The central solid solution layer paste 21P is printed in a central region of each multilayer body 2 in the length direction L and the width direction W when the multilayer body 2 is produced. The central region is a region inner than a position of the distance D1 from both end surfaces C of the multilayer body 2 in the length direction L and both side surfaces B of the multilayer body 2 in the width direction W, the distance D1 being about 10 μm in the present example embodiment, for example.

In the central solid solution layer paste 21P, an amount of Sn in the solid solution is about 0.008 or more and about 0.025 or less and preferably about 0.02 relative to a total amount of moles of Ni and Sn, that is, about 2% by mole, for example. In this regard, the ratio of Sn to Ni in the central solid solution layer paste before firing is substantially equal to that after firing.

Outer Solid Solution Layer Paste Printing Step S22

Subsequently, as illustrated in FIG. 5C, an outer solid solution layer paste 22P is printed on the surface of the inner layer portion ceramic green sheet 101. The outer solid solution layer paste 22P is printed in a peripheral region that surrounds the central region and that is outer than the position of the distance D1 from both end surfaces C of the multilayer body 2 in the length direction L and both side surfaces B of the multilayer body 2 in the width direction W.

In the outer solid solution layer paste 22P, an amount of Sn in the solid solution is about 0.001 or more and about 0.005 or less and preferably about 0.005 relative to a total amount of moles of Ni and Sn, that is, about 0.5% by mole, for example. The ratio of Sn to Ni included in the outer solid solution layer paste 22P is smaller than the ratio of Sn to Ni included in the central solid solution layer paste 21P.

Inner Electrode Layer Paste Printing Step S3

Next, as illustrated in FIG. 5D, an inner electrode layer paste 102 is printed in an inner electrode forming region P in which a solid solution layer paste 20P including the central solid solution layer paste 21P and the outer solid solution layer paste 22P is printed.

Other-Surface-Side Paste Printing Step S4

The other-surface-side paste printing step S4 also includes a central solid solution layer paste printing step S41 and an outer solid solution layer paste printing step S42 akin to that in the one-surface-side solid solution layer paste printing step S2.

Central Solid Solution Layer Paste Printing Step S41

Initially, as illustrated in FIG. 5E, the central solid solution layer paste 21P is printed in the central region on the surface of the inner electrode layer paste 102.

Outer Solid Solution Layer Paste Printing Step S42

Subsequently, as illustrated in FIG. 5F, the outer solid solution layer paste 22P is printed in the peripheral region on the surface of the inner electrode layer paste 102.

According to the steps described above, a multilayer sheet 103 is produced.

Stacking Step S5

Figure 6:
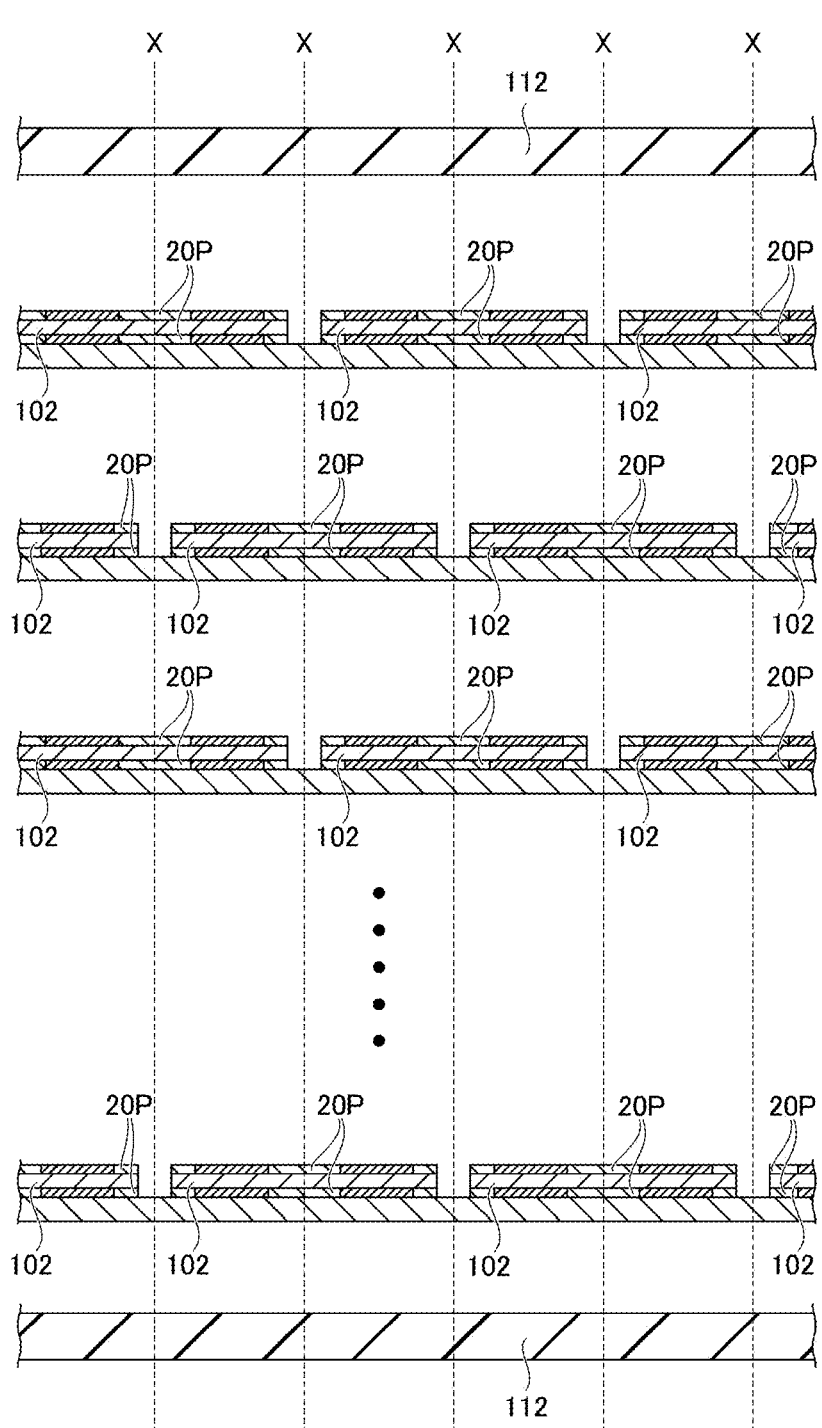
FIG. 6 is a diagram illustrating a stacking step in the method for manufacturing the multilayer ceramic capacitor 1.

Next, in the stacking step S5, a plurality of multilayer sheets 103 are stacked. FIG. 6 is a diagram illustrating the stacking step. As illustrated in the drawing, a plurality of multilayer sheets 103 are stacked so that regions, in which the solid solution layer paste 20P and the inner electrode layer paste 102 are printed, of adjacent multilayer sheets 103 are shifted by a half-pitch from each other. Further, an outer layer portion ceramic green sheet 112 is stacked on both sides of the plurality of stacked multilayer sheets 103.

Heat Pressure Bonding Step S6

Subsequently, the outer layer portion ceramic green sheets 112 and the plurality of stacked multilayer sheets 103 are heat-pressure bonded. Accordingly, a mother block 110 is formed.

Mother Block Cutting Step S7

Thereafter, the mother block 110 is cut along a cut line X illustrated in FIG. 6 and a cut line intersecting the cut line X which correspond to the dimensions of the multilayer body 2. Accordingly, a plurality of multilayer bodies 2 are produced.

Outer-Electrode-Forming Step S8

Next, the outer electrode 3 is formed on both end portions of the multilayer body 2.

Firing Step S9

Subsequently, the multilayer body 2 provided with the outer electrodes 3 is heated at a predetermined firing temperature for a predetermined time in a nitrogen atmosphere. Accordingly, the multilayer ceramic capacitor 1 is produced. In such an instance, the inner layer portion ceramic green sheet 101 and the outer layer portion ceramic green sheet 112 are sintered so as to become ceramic and to form the dielectric layer 11 and the outer layer portion 13.

In the firing step S9, the inner electrode layer paste 102 becomes the inner electrode layer 12, the central solid solution layer paste 21P printed on both sides of the inner electrode layer paste 102 in the stacking direction T becomes the central solid solution layer 21 due to heating, and the outer solid solution layer paste 22P becomes the outer solid solution layer 22 due to heating.

In the central solid solution layer 21, an amount of Sn in the solid solution is about 0.008 or more and about 0.025 or less and preferably about 0.02 relative to a total amount of moles of Ni and Sn, that is, about 2% by mole, for example. In the outer solid solution layer 22, an amount of Sn in the solid solution is about 0.001 or more and about 0.005 or less and preferably about 0.005 relative to a total amount of moles of Ni and Sn, that is, about 0.5% by mole, for example.

According to the present example embodiment, the strength of the inner electrode layer 12 is improved, and the voltage resistance (withstand voltage) of the multilayer ceramic capacitor 1 is improved due to the solid solution layer 20 being formed on both surfaces of the inner electrode layer 12 in the stacking direction T.

Further, a state (electric barrier height) in the vicinity of the interface to the dielectric layer 11 of the inner electrode layer 12 is changed due to Ni and Sn forming a solid solution, and a high-temperature load life can be improved. Accordingly, the multilayer ceramic capacitor 1 capable of having excellent reliability when a voltage is applied can be provided.

In this regard, of the solid solution layer 20, in the central solid solution layer 21, an amount of Sn in the solid solution is about 0.008 or more and about 0.025 or less and preferably about 0.02 relative to a total amount of moles of Ni and Sn, that is, about 2% by mole, for example. In the outer solid solution layer 22, an amount of Sn in the solid solution is about 0.001 or more and about 0.005 or less and preferably about 0.005 relative to a total amount of moles of Ni and Sn, that is, about 0.5% by mole, for example.

That is, in the solid solution layer 20, the central solid solution layer 21 that is an inner region has a higher Sn content than the outer solid solution layer 22. Therefore, the strength of the central region of the inner electrode layer 12 can be particularly improved.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
a multilayer body in which a dielectric layer having a thickness of about 0.8 μm or more and about 4.1 μm or less and an inner electrode layer having a thickness of about 0.5 μm or more and about 1.2 μm or less are alternately stacked, a number of each of the dielectric layer and the inner electrode layer being 200 or more and 650 or less; wherein
a solid solution layer in which a first metal component serving as a primary component of the inner electrode layer defines a solid solution with a second metal component different from the first metal component is located at an interface between the inner electrode layer and the dielectric layer;
the solid solution layer includes:
a central solid solution layer located about 10 μm or more from an end portion in a facing portion in a length direction and a width direction, where adjacent ones of the inner electrode layers oppose each other; and
an outer solid solution layer surrounding the central solid solution layer; and
a ratio of the second metal component to the first metal component in the central solid solution layer is larger than that in the outer solid solution layer.

2. The electronic component according to claim 1, wherein
in the central solid solution layer, an amount of the second metal component in the solid solution is about 0.008 or more and about 0.025 or less relative to a total amount of moles of the second metal component and the first metal component; and
in the outer solid solution layer, an amount of the second metal component in the solid solution is about 0.001 or more and about 0.005 or less relative to a total amount of moles of the second metal component and the first metal component.

3. The electronic component according to claim 1, wherein the first metal component is Ni.

4. The electronic component according to claim 1, wherein the second metal component is Sn, In, Ga, Zn, Bi, Pb, Fe, V, Y, or Cu.

5. The electronic component according to claim 1, wherein a thickness of the central solid solution layer and a thickness of the outer solid solution layer are about 1 nm or more and about 20 nm or less.

6. The electronic component according to claim 1, wherein
a length-direction dimension is about 0.6 mm or more and about 3.2 mm or less;
a width-direction dimension is about 0.3 mm or more and about 2.5 mm or less; and
a thickness-direction dimension is about 0.3 mm or more and about 2.5 mm or less.

7. The electronic component according to claim 1, wherein the electronic component is a multilayer capacitor.

8. The electronic component according to claim 7, wherein the multilayer capacitor has a withstand voltage of about 25 V.

9. The electronic component according to claim 7, wherein the multilayer capacitor has a 1005 to 2012 chip size.

10. The electronic component according to claim 7, wherein the multilayer capacitor has a dimension in a length direction of about 1.0 mm or more and about 2.0 mm or less, and a dimension in a width direction and in a thickness direction of about 0.5 mm or more and about 1.25 mm or less.

11. The electronic component according to claim 1, wherein the electronic component has a substantially rectangular parallelepiped shape.

12. The electronic component according to claim 1, wherein the multilayer body includes side gap portions on both sides.

13. The electronic component according to claim 1, wherein the solid solution layer includes Ni atoms in an Ni atom arrangement and randomly substitute with Sn atoms.

14. The electronic component according to claim 1, wherein the solid solution layer is located at interfaces on both sides of the inner electrode layer in the stacking direction.

15. The electronic component according to claim 1, wherein the solid solution layer is located at only the interface on one side of the inner electrode layer in the stacking direction.

16. The electronic component according to claim 1, wherein the solid solution layer is provided on every one of the inner electrode layer.

17. The electronic component according to claim 1, wherein the solid solution layer is located on only a portion of the inner electrode layers.

18. The electronic component according to claim 1, further comprising outer electrodes on end surfaces of the multilayer body.

19. The electronic component according to claim 1, wherein the multilayer body includes a plurality of capacitor elements coupled in parallel.

20. The electronic component according to claim 1, wherein the central solid solution layer has a higher Sn content than that of the outer solid solution layer.

* * * * *